(12) United States Patent
Lee

(10) Patent No.: US 11,945,468 B2
(45) Date of Patent: Apr. 2, 2024

(54) DRIVER ASSISTANCE APPARATUS AND METHOD THEREOF

(71) Applicant: HL KLEMOVE CORP., Incheon (KR)

(72) Inventor: Dokyung Lee, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 120 days.

(21) Appl. No.: 17/124,776

(22) Filed: Dec. 17, 2020

(65) Prior Publication Data

US 2021/0188318 A1 Jun. 24, 2021

(30) Foreign Application Priority Data

Dec. 20, 2019 (KR) .......................... 10-2019-0172333

(51) Int. Cl.
*B60W 60/00* (2020.01)
*B60W 30/095* (2012.01)
*G06V 20/58* (2022.01)

(52) U.S. Cl.
CPC .... *B60W 60/0015* (2020.02); *B60W 30/0956* (2013.01); *G06V 20/584* (2022.01); *B60W 2420/52* (2013.01); *B60W 2554/20* (2020.02); *B60W 2554/80* (2020.02); *B60W 2556/65* (2020.02)

(58) Field of Classification Search
CPC .... B60W 10/18; B60W 10/20; B60W 30/095; B60W 30/0956; B60W 30/09; B60W 40/04; B60W 60/0015; B60W 60/0011; B60W 60/001; B60W 60/0027; B60W 60/00272; B60W 60/00274; B60W 60/00276; B60W 2420/403; B60W 2420/42; B60W 2420/52; B60W 2422/90; B60W 2422/95; B60W 2554/20; B60W 2554/80; B60W 2554/4041; B60W 2554/4042; B60W 2554/4045; B60W 2556/65; B60W 2556/45; G06V 20/56; G06V 20/584; G06V 20/58

See application file for complete search history.

(56) References Cited

U.S. PATENT DOCUMENTS

| 2018/0074507 | A1* | 3/2018 | Gao | ..................... G05D 1/0214 |
| 2018/0322776 | A1* | 11/2018 | Bararsani | ............... G08G 1/012 |
| 2019/0354786 | A1* | 11/2019 | Lee | ..................... G05D 1/0246 |
| 2020/0049511 | A1* | 2/2020 | Sithiravel | .............. G01C 21/28 |

(Continued)

FOREIGN PATENT DOCUMENTS

| KR | 20180062503 A | 6/2018 |
| KR | 20190007286 A | 1/2019 |

*Primary Examiner* — Russell Frejd
*Assistant Examiner* — Brandon Z Willis
(74) *Attorney, Agent, or Firm* — Hauptman Ham, LLP

(57) ABSTRACT

A driver assistance system (DAS) comprises camera installed on a vehicle, having a field of view in front of the vehicle, and configured to acquire image data; and a controller including a processor configured to process the image data. The controller may be configured to identify at least one object obstructing a driving of the vehicle based on the image data, identify a stopped vehicle among the at least one object based on the image data, and set a driving route of the vehicle based on the position of the at least one object and the position of the stopped vehicle, and controls at least one of a braking device and a steering device of the vehicle so that the vehicle travels along the driving route.

20 Claims, 10 Drawing Sheets

(56) References Cited

U.S. PATENT DOCUMENTS

| | | | |
|---|---|---|---|
| 2020/0317192 A1* | 10/2020 | Awane | B62D 15/025 |
| 2020/0391747 A1* | 12/2020 | Ohmura | B60W 30/09 |
| 2020/0410853 A1* | 12/2020 | Akella | G08G 1/04 |
| 2021/0370932 A1* | 12/2021 | Yan | G06N 5/046 |

* cited by examiner

DRIVER ASSISTANCE APPARATUS AND METHOD THEREOF

CROSS-REFERENCE TO RELATED APPLICATION(S)

This application is based on and claims priority under 35 U.S.C. § 119 to Korean Patent Application No. 10-2019-0172333, filed on Dec. 20, 2019 in the Korean Intellectual Property Office, the disclosure of which is incorporated by reference in its entirety.

BACKGROUND

1. Technical Field

Embodiments of the present disclosure relate to a driver assistance apparatus, and more particularly, a driver assistance apparatus configured to generate a driving route of a vehicle.

2. Description of the Related Art

In general, a vehicle is a machine which travels on roads or tracks using fossil fuels, electricity, etc. Vehicles may move in various directions according to rotation of at least one wheel mounted to a vehicle body. Such vehicles may include, for example, a three-wheeled or four-wheeled vehicle, a two-wheeled vehicle such as a motorcycle, a motorized bicycle, construction equipment, a bicycle, a train traveling on rails, and the like.

The number of users who use vehicles as simple transportation means in modern society is rapidly increasing. With rapid development of vehicle technology, users or people who use vehicles can easily enjoy long distance travel, resulting in a high standard of living in daily life. However, within areas with high population density, such as Korea, road traffic situations may be seriously deteriorated such that traffic congestion becomes more serious day by day.

In recent times, in order to mitigate driver difficulty as well as to increase driver's convenience during vehicle driving, many developers and companies are conducting intensive research into a vehicle provided with an advanced driver assistance system (ADAS), such that the ADAS-embedded vehicle can actively provide the driver with various kinds of information, for example, vehicle states, driver's states, peripheral environment information, etc.

A representative example of the ADAS embedded in the vehicle may include a Forward Collision Avoidance (FCA) system, an Autonomous Emergency Brake (AEB) system, a Driver Attention Warning (DAW) system, etc. Such a system is a system for determining the risk of collision with an object in the driving situation of the vehicle, and providing a collision avoidance and warning through emergency braking in the collision situation.

The driver assistance device may further create a driving route for the vehicle to travel without collision with an object. The existing driver assistance device could create a driving route based on a lane or a preceding vehicle.

However, the existing driver assistance device fails to generate a driving route for a vehicle unless a lane or a preceding vehicle is detected, and delegates control of the vehicle to the driver.

SUMMARY

In view of the above, it is an aspect of the present disclosure to provide a driver assistance system and a driver assistance method for continuously generating a driving route of the vehicle even if the lane or the preceding vehicle is not detected.

In accordance with an aspect of the present disclosure, a driver assistance system (DAS) may include a camera disposed on a vehicle, having a field of view in front of the vehicle, and configured to acquire an image data; a controller including a processor configured to process the image data. The controller may be configured to identify at least one object obstructing a driving of the vehicle based on the image data, identify a stopped vehicle among the at least one object based on the image data, and set a driving route of the vehicle based on the position and speed of the at least one object and the position of the stopped vehicle, and controls at least one of a braking device and a steering device of the vehicle so that the vehicle travels along the driving route.

The controller may be configured to set a free-space based on a position of the at least one object and the position of the stopped vehicle, and set the driving route for the vehicle to travel within the free-space.

The controller may be configured to set a free-space candidate based on the position of the at least one object, and set the free-space based on a difference between the free-space candidate and a range in which the stopped vehicle is movable.

The controller may be configured to set a first free space candidate based on the position of the stopped object among the at least one object, identify a range in which the moving object is movable based on the position of the moving object among the at least one object, and set the free-space candidate based on a difference between the first free-space candidate and a range in which the moving object is movable.

The controller may be configured to determine, based on the image data, that another vehicle including a lit tail light is stopped.

The controller may be configured to determine, based on the image data, that another vehicle including a flashing direction indicator light is stopped.

The controller may be configured to receive driving information of another vehicle through a wireless communication device installed in the vehicle, and determine, based on the driving information of another vehicle, that the other vehicle is stopped.

In accordance with an aspect of the present disclosure, a driver assistance method, the method may comprise processing an image data acquired by a camera having a field of view in front of a vehicle installed in a vehicle; identifying at least one object obstructing the driving of the vehicle based on the image data; identifying a stopped vehicle among the at least one object based on the image data; setting a driving route of the vehicle based on the position of the at least one object and the position of the stopped vehicle; and controlling at least one of a braking device and a steering device of the vehicle so that the vehicle travels along the driving route.

The setting of the driving route of the vehicle may include setting a free-space based on a position of the at least one object and the position of the stopped vehicle, and setting the driving route for the vehicle to travel within the free-space. The setting of the free-space may include setting a free-space candidate based on the position of the at least one object, and setting the free-space based on a difference between the free-space candidate and a range in which the stopped vehicle is movable.

The setting of the free-space candidate may include setting a first free space candidate based on the position of the stopped object among the at least one object, identifying a range in which the moving object is movable based on the position of the moving object among the at least one object, and setting the free-space candidate based on a difference between the first free-space candidate and a range in which the moving object is movable.

The identifying of the stopped vehicle may include determining, based on the image data, that another vehicle including a lit tail light is stopped.

The identifying of the stopped vehicle may include determining, based on the image data, that another vehicle including a flashing direction indicator light is stopped.

The identifying of the stopped vehicle may include determining, based on driving information of another vehicle received through wireless communication device installed in the vehicle, that another vehicle is stopped.

The method may further include acquiring detection data by a sensor having at least one detection field of a front and a side of a vehicle by a group consisting of a radar sensor and a lidar sensor installed in the vehicle; and identifying the position of at least one object based on the image data and the detection data.

In accordance with an aspect of the present disclosure, a driver assistance system (DAS) may comprise a camera installed on a vehicle, having a field of view in front of the vehicle, and configured to acquire an image data; a sensor configured to have at least one detection field of the front and side of the vehicle, and obtain a detection data in the group consisting of a radar sensor and a lidar sensor which are installed in the vehicle; and a controller including a processor configured to process the image data and the detection data.

The controller may be configured to identify at least one object obstructing a driving of the vehicle based on the image data and the detection data, identify a position and speed of at least one object based on the image data and the detection data, identify a stopped vehicle among the at least one object based on the image data and, set a driving route of the vehicle based on the position and speed of the at least one object and the position of the stopped vehicle, and control at least one of a braking device and a steering device of the vehicle so that the vehicle travels along the driving route.

The controller may be configured to set a free-space based on a position and speed of the at least one object and the position of the stopped vehicle, and set the driving route for the vehicle to travel within the free-space.

The controller may be configured to determine, based on the image data, that another vehicle including a lit tail light is stopped.

The controller may be configured to determine, based on the image data that another vehicle including a flashing direction indicator light is stopped.

The controller may be configured to receive driving information of another vehicle through a wireless communication device installed in the vehicle, and determine, based on the driving information of the another vehicle, that the other vehicle is stopped.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings.

Figure 1:
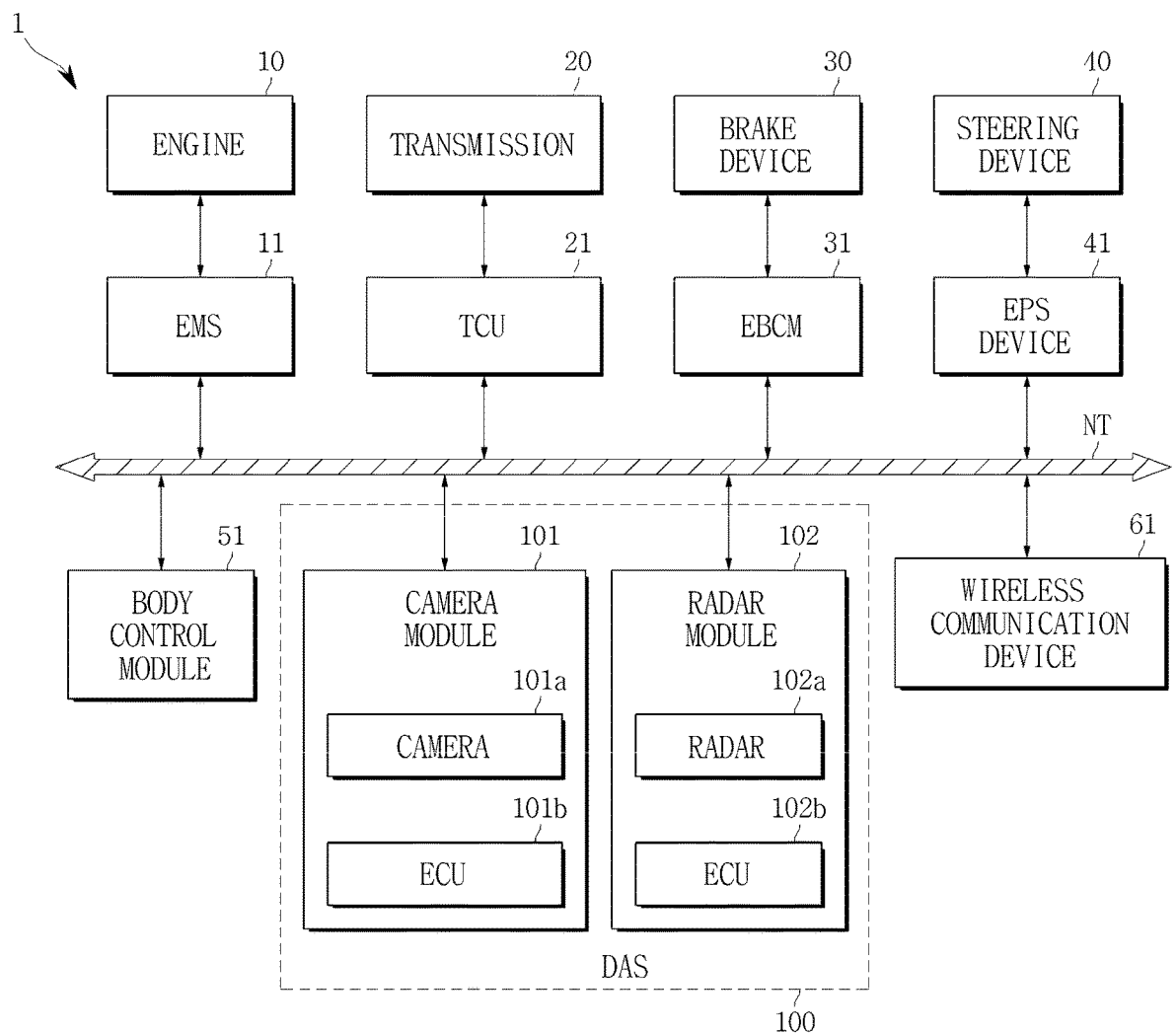
FIG. 1 illustrates a configuration of a vehicle according to an embodiment.

FIG. 1 illustrates a configuration of a vehicle according to an embodiment.

Referring to FIG. 1, the vehicle 1 may include an engine 10, a transmission 20, a brake device 30, and a steering device 40. The engine 10 may include at least one cylinder and at least one piston, and may generate power needed to drive the vehicle 1. Alternatively or additionally, the engine 10 may include an electric or other motor, such as an electric motor including a rotor and a stator, configured to generate power to move the vehicle 1. The transmission 20 may include a plurality of gears, and may transmit power generated by the engine 10 to wheels of the vehicle 1. The brake device 30 may decelerate or stop the vehicle 1 through frictional force on wheels. The brake device 30 may include one or more brake pads and brake shoes operative to decelerate or stop the vehicle. The steering device 40 may change the traveling direction of the vehicle 1. The steering device may include a linkage operative to change a direction or orientation of wheel(s) of the vehicle 1.

The vehicle 1 may include a plurality of electronic constituent elements. For example, the vehicle 1 may further include an Engine Management System (EMS) 11, a Transmission Controller also referred to as a Transmission Control Unit (TCU) 21, an Electronic Brake Controller also referred to as an Electronic Brake Control Module (EBCM) 31, an Electronic Power Steering (EPS) device 41, a Body Control Module (BCM), and a Driver Assistance System (DAS) 100.

The EMS 11 may control the engine 10 in response to either the driver's acceleration intention from the acceleration pedal or a request signal from the driver assistance system (DAS) 100. For example, the EMS 11 may control torque of the engine 10.

The TCU 21 may control the transmission 20 in response to either a driver's gearshift command activated by a gearshift lever and/or a driving speed of the vehicle 1. For example, the TCU 21 may adjust or regulate a gearshift ratio from the engine 10 to wheels of the vehicle 1.

The electronic brake control module (EBCM) 31 may control a brake device in response to either the driver's brake intention from a brake pedal or slippage of wheels. For example, the EBCM 31 may temporarily release wheel braking in response to wheel slippage detected in a braking mode of the vehicle 1, resulting in implementation of an Anti-lock Braking System (ABS). The EBCM 31 may selectively release braking of wheels in response to oversteering and/or understeering detected in a steering mode of the vehicle 1, resulting in implantation of Electronic Stability Control (ESC). In addition, the EBCM 31 may temporarily brake wheels in response to wheel slippage detected by vehicle driving, resulting in implementation of a Traction Control System (TCS).

In addition, the electronic braking control module 31 may control the braking device 30 in response to a request from the driver assistance device 100. For example, the electronic braking control module 31 receives a deceleration request including a deceleration rate from the driver assistance device 100, and sets the braking device 30 to decelerate the vehicle 1 depending on the requested deceleration rate.

The electronic power steering (EPS) device 41 may assist the steering device 40 in response to the driver's steering intention from the steering wheel, such that the EPS device 41 may assist the driver in easily handling the steering wheel. For example, the EPS device 41 may assist the steering wheel 40 in a manner that steering force decreases in a low-speed driving mode or a parking mode of the vehicle 1 but increases in a high-speed driving mode of the vehicle 1.

In addition, the electronic steering device 41 may control the steering device 40 in response to a request from the driver assistance device 100.For example, the electronic steering device 41 receives a steering request including a steering torque from the driver assistance device 100, and controls the steering device 40 so that the vehicle 1 is steered depending on the requested steering torque.

A body control module 51 may control various electronic components that are capable of providing the driver with user convenience or guaranteeing driver safety. For example, the body control module 51 may control headlamps (headlights), wipers, an instrument or other cluster, a multifunctional switch, turn signal indicators, or the like.

The wireless communication device 61 may communicate with an external device (e.g., an external communication infrastructure, an external traffic infrastructure, or an external vehicle) to provide convenience to a driver or ensure safety of the driver.

The wireless communication device 61 can send and receive data using various wireless communication standard such as external communication infrastructure (e.g., base station, etc.), external traffic infrastructure (e.g., traffic lights, etc.), or external vehicles (e.g., preceding vehicle, trailing vehicle, opposite vehicle, etc.). For example, the wireless communication device 61 may exchange data with an external device using a wireless communication standard such as Dedicated Short Range Communication (DSRC) or wireless access in vehicular environments (WAVE) for a vehicle. In another example, the wireless communication device 61 Data can be exchanged with external devices using mobile communication standards such as Time Division Multiple Access (TDMA), Code Division Multiple Access (CDMA), Wide Code Division Multiple Access (WCDMA), CDMA2000 (Code Division Multiple Access 2000), Wireless Broadband (Wibro), WiMAX (World Interoperability for Microwave Access: WiMAX), Long Term Evolution (LTE) or WiBro Evolution (Wireless Broadband Evolution).

The driver assistance system (DAS) 100 may assist the driver in easily handling (e.g., driving, braking, and steering) the vehicle 1. For example, the DAS 100 may detect peripheral environments (e.g., a peripheral vehicle, pedestrian, cyclist, lane, traffic sign, or the like) of the vehicle 1 (i.e., host vehicle), and may perform driving, braking, and/or steering of the vehicle 1 in response to the detected peripheral environments.

The DAS 100 may provide the driver with various functions. For example, the DAS 100 may provide the driver with a Lane Departure Warning (LDW) function, a Lane Keeping Assist (LKA) function, a High Beam Assist (HBA) function, an Autonomous Emergency Braking (AEB) function, a Traffic Sign Recognition (TSR) function, a Smart Cruise Control (SCC) function, a Blind Spot Detection (BSD) function, or the like.

The DAS 100 may include a camera module 101 operative to acquire image data of a peripheral region of the vehicle 1 (e.g., a region outside of and surrounding the vehicle 1), and a radar module 102 operative to acquire data about a peripheral object present in the peripheral region of the vehicle 1. The camera module 101 may include a camera 101a or multiple cameras and an Electronic Control Unit (ECU) controller 101b. The camera 101a may capture an image including a forward region of the vehicle 1 (e.g., a region in front of the vehicle 1), and may include an image processor operative to process the captured image to recognize peripheral vehicles, pedestrians, cyclists, lanes, traffic signs, or the like in the captured image. The radar module 102 may include a radar 102a or multiple radars and an Electronic Control Unit (ECU) controller 102b, and may acquire or determine a relative position, a relative speed, or the like of the peripheral object (e.g., a peripheral vehicle, a pedestrian, or a cyclist) of the vehicle 1 based on sensed radar data.

The scope or spirit of the DAS 100 according to the present disclosure is not limited thereto, and the DAS 100 may further include a Light Detection And Ranging (LiDAR) sensor to detect the presence or absence of a peripheral object by monitoring (or scanning) the peripheral region of the vehicle 1.

The above-mentioned electronic components may communicate with each other through a vehicle communication network (NT). For example, the electronic components may perform data communication through Ethernet, Media Oriented Systems Transport (MOST), a FlexRay, a Controller Area Network (CAN), a Local Interconnect Network (LIN), or the like. For example, the DAS 100 may respectively transmit a drive control signal, a brake signal, and a steering signal to the EMS 11, the EBCM 31, and the EPS device 41 over the vehicle communication network (NT).

Figure 2:
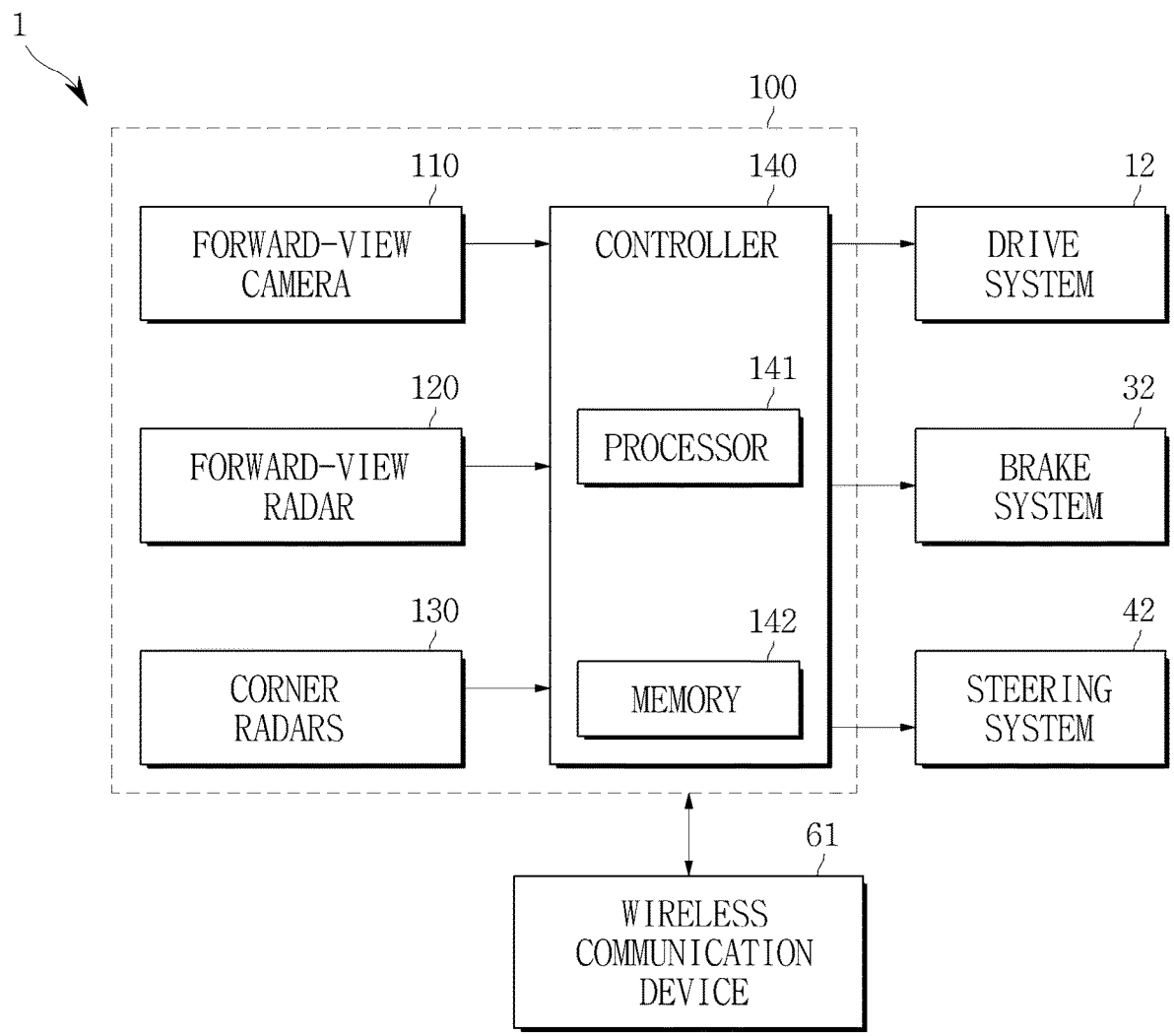
FIG. 2 illustrates a configuration of a driver assistance system according to an embodiment.
Figure 3:
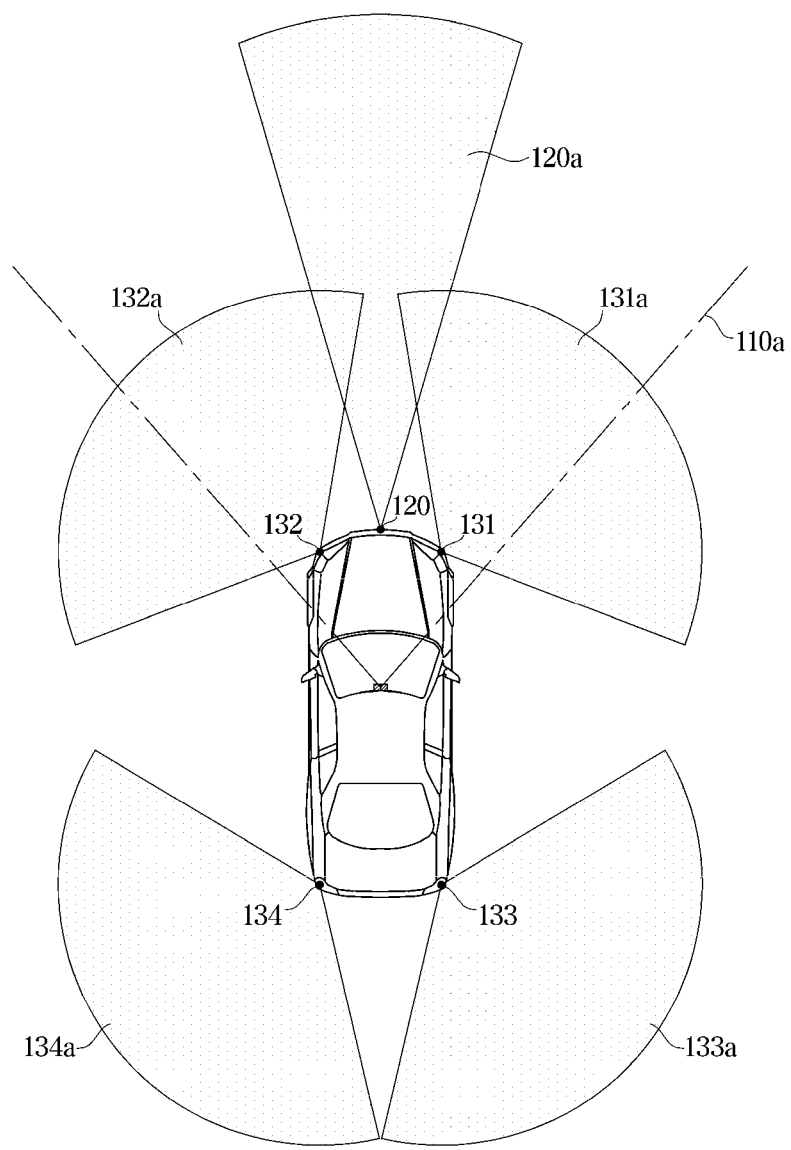
FIG. 3 illustrates a camera and a radar included in a driver assistance system according to an embodiment.

FIG. 2 is a block diagram illustrating the driver assistance system (DAS) according to an embodiment of the present disclosure. FIG. 3 is a conceptual diagram illustrating fields of view/sensing of a camera and a radar device for use in the driver assistance system (DAS) according to an embodiment of the present disclosure.

Referring to FIG. 2, the vehicle 1 may include a drive system 12, a brake system 32, a steering system 42, a wireless communication device 61, and a driver assistance system (DAS) 100.

The drive system 12 includes an engine management system 11 (see FIG. 1), an engine 10 (see FIG. 1), a transmission control unit 21 (see FIG. 1) and a transmission 20 (see FIG. 1) shown in FIG. 1. The braking system 32 may include an electronic braking control module 31 (see FIG. 1) and a braking device 30 (see FIG. 1) shown in FIG. 1. The steering system 42 may include an electronic steering device 41 (see FIG. 1) and a steering device 40 (see FIG. 1) shown in FIG. 1. The wireless communication device 61 may be the same as the wireless communication device 61 shown in FIG. 1.

The DAS 100 may include one or more of a forward-view camera 110, a forward-view radar 120, and a plurality of corner radars 130.

The forward-view camera 110 may include a Field of View (FOV) 110a oriented to the forward region of the vehicle 1, as shown in FIG. 3. The forward-view camera 110 may be installed at a windshield of the vehicle 1.

The forward-view camera 110 may capture an image of the forward region of the vehicle 1, and may acquire data of the forward-view image of the vehicle 1. The forward-view image data of the vehicle 1 may include information about the position of a peripheral vehicle, a pedestrian, a cyclist, or a lane located in the forward region of the vehicle 1.

The forward-view camera 110 may include a plurality of lenses and a plurality of image sensors. Each image sensor may include a plurality of photodiodes to convert light into electrical signals, and the photodiodes may be arranged in a two-dimensional (2D) matrix.

The forward-view camera 110 may be electrically coupled to the processor or controller 140. For example, the forward-view camera 110 may be connected to the controller 140 through a vehicle communication network (NT), Hardwires, or a Printed Circuit Board (PCB).

The forward-view camera 110 may transmit the forward-view image data of the vehicle 1 to the controller 140.

The forward-view radar 120 may include a Field of Sensing (FOS) 120a oriented to the forward region of the vehicle 1 as shown in FIG. 3. The forward-view radar 120 may be mounted to, for example, a grille or a bumper of the vehicle 1.

The forward-view radar 120 may include a transmission (Tx) antenna (or a transmission (Tx) antenna array) to emit transmission (Tx) waves to the forward region of the vehicle 1 and a reception (Rx) antenna (or a reception (Rx) antenna array) to receive waves reflected from any object located in the FOS. The forward-view radar 120 may acquire forward-view radar data not only from Tx waves received from the Tx antenna, but also from reflected waves received from the Rx antenna. The forward-view radar data may include not only information about a distance between the host vehicle 1 and a peripheral vehicle (or a pedestrian or cyclist or other preceding object) located in the forward region of the host vehicle 1, but also information about a speed of the peripheral vehicle, the pedestrian, or the cyclist. The forward-view radar 120 may calculate a relative distance between the host vehicle 1 and any object based on a difference in phase (or difference in time) between Tx waves and reflected waves, and may calculate a relative speed of the object based on a difference in frequency between the Tx waves and the reflected waves.

For example, the forward-view radar 120 may be coupled to the controller 140 through a vehicle communication network (NT), Hardwires, or a PCB. The forward-view radar 120 may transmit forward-view radar data to the controller 140.

The plurality of corner radars 130 may include a first corner radar 131 mounted to a forward right side of the vehicle 1, a second corner radar 132 mounted to a forward left side of the vehicle 1, a third corner radar 133 mounted to a rear right side of the vehicle 1, and a fourth corner radar 134 mounted to a rear left side of the vehicle 1.

The first corner radar 131 may include a field of sensing (FOS) 131a oriented to a forward right region of the vehicle 1, as shown in FIG. 3. For example, the forward-view radar 120 may be mounted to a right side of a front bumper of the vehicle 1. The second corner radar 132 may include an FOS 132a oriented to a forward left region of the vehicle 1, and may be mounted to, for example, a left side of the front bumper of the vehicle 1. The third corner radar 133 may include an FOS 133a oriented to a rear right region of the vehicle 1, and may be mounted to, for example, a right side of a rear bumper of the vehicle 1. The fourth corner radar 134 may include an FOS 134a oriented to a rear left region of the vehicle 1, and may be mounted to, for example, a left side of the rear bumper of the vehicle 1.

Each of the first, second, third, and fourth radars 131, 132, 133, and 134 may include a transmission (Tx) antenna and a reception (Rx) antenna. The first, second, third, and fourth corner radars 131, 132, 133, and 134 may respectively acquire first corner radar data, second corner radar data, third corner radar data, and fourth corner radar data. The first corner radar data may include information about a distance between the host vehicle 1 and an object (e.g., a peripheral vehicle, a pedestrian, or a cyclist) present in a forward right region of the host vehicle 1, and information about a speed of the object. The second corner radar data may include information about a distance between the host vehicle 1 and an object (e.g., a peripheral vehicle, a pedestrian, or a cyclist) present in a forward left region of the host vehicle 1, and information about a speed of the object. The third corner radar data may include information about a distance between the host vehicle 1 and an object (e.g., a peripheral vehicle, a pedestrian, or a cyclist) present in a rear right region of the host vehicle 1, and information about a speed of the object. The fourth corner radar data may include information about a distance between the host vehicle 1 and an object (e.g., a peripheral vehicle, a pedestrian, or a cyclist) present in a rear left region of the host vehicle 1, and information about a speed of the object.

Each of the first, second, third, and fourth corner radars 131, 132, 133, and 134 may be connected to the controller 140 through, for example, a vehicle communication network NT, Hardwires, or a PCB. The first, second, third, and fourth corner radars 131, 132, 133, and 134 may respectively transmit first corner radar data, second corner radar data, third corner radar data, and fourth corner radar data to the controller 140.

The controller 140 may include a controller (ECU) 101b (see FIG. 1) of the camera module 101 (see FIG. 1), a controller (ECU) 102b (see FIG. 2) of the radar module 102 (see FIG. 1), and/or an additional integrated controller.

The controller 140 may include a processor 141 and a memory 142.

The processor 141 may process forward-view image data of the forward-view camera 110, forward-view radar data of the forward-view radar 120, and corner radar data of the plurality of corner radars 130, and may generate a brake signal controlling the brake system 32 and a steering signal controlling the steering system 42. For example, the processor 141 may include an image processor to process forward-view image data of the forward-view camera 110, a digital signal processor to process radar data detected by the radars 120 and 130, and/or a Micro-Control Unit (MCU) to generate a brake signal and a steering signal.

The processor 141 may determine a lane in front of the vehicle 1 based on the front image data of the forward-view camera 110 and the front radar data of the forward-view radar 120.

Specifically, the processor 141 may obtain the positions (distances and directions) and relative speeds of objects in front of the vehicle 1 based on forward detection data of the front radar 120. The processor 141 can obtain the position (direction) and classification of objects in front of the vehicle 1 (for example, whether the object is another vehicle, a pedestrian, or a cyclist, etc.) based on the front image data of the front camera 110. In addition, the processor 141 matches the objects detected by the front image data to the objects detected by the front detection data, and obtains a classification, a position, and a relative speed of objects in front of the vehicle 1 based on the matching result.

The processor 141 may generate a driving signal, a braking signal, and a steering signal based on the classification, position, and relative speed of front objects. For example, the processor 141 may transmit a driving signal to the drive system 12 so that the distance of the preceding vehicle (or the time to the preceding vehicle) becomes a distance set by the driver. In addition, the processor 141 calculates a time (Time to Collision, TTC) between the vehicle 1 and the front object based on the position (distance) and the relative speed of the front objects, and may warn the driver of a collision or transmit a braking signal to the braking system 32 based on a comparison between the time until collision TTC and a predetermined reference time.

The processor 141 may obtain the position (distance and direction) and relative speed of the lateral (front right, front left, rear right, rear left) objects of the vehicle 1 based on the corner detection data of the plurality of corner radars 130.

The processor 141 may transmit a steering signal to the steering system 42 based on the location (distance and direction) and relative speed of lateral objects of the vehicle 1. For example, if a collision with an object in front is determined based on the time to collision or distance to collision, the processor 141 may transmit a steering signal to the steering system 42 in order to avoid a collision with a front object.

The processor 141 may determine whether to avoid a collision with a front object by changing the driving direction of the vehicle 1 based on the location (distance and direction) and relative speed of the lateral objects of the vehicle 1. For example, when there is no object located on the side of the vehicle 1, the processor 141 may transmit a steering signal to the steering system 42 in order to avoid a collision with a front object. When the collision with the side object is not predicted after the steering of the vehicle 1 based on the position (distance and direction) and the relative speed of the side objects, the processor 141 may transmit a steering signal to the steering system 42 in order to avoid a collision with a front object. When the collision with the side object is predicted after the steering of the vehicle 1 based on the position (distance and direction) and the relative speed of the side objects, the processor 141 may not transmit the steering signal to the steering system 42.

In addition, the processor 141 may generate a driving route based on the communication data of the wireless communication device 61 and/or the front image data of the front camera 110 and/or the forward detection data of the front radar 120, of the vehicle 1, and may transmit a driving signal and/or a braking signal and/or a steering signal to the braking system 32 and the steering system 42, respectively, so that the vehicle 1 travels along the generated driving route.

For example, the processor 141 may obtain the position of the vehicle 1, the relative position of objects (e.g., other vehicles, pedestrians, cyclists, etc.) around the vehicle 1, a relative speed, and the like based on the communication data of the wireless communication device 61 and/or the front image data of the front camera 110 and/or the forward detection data of the front radar 120. The processor 141 may identify a free-space in which the vehicle 1 can travel, based on a relative position and/or a relative speed of an object around the vehicle 1. Also, the processor 141 may generate a driving route through which the vehicle 1 can travel without colliding with surrounding objects in the free-space. Further, the processor 141 generates a driving signal and/or a braking signal and/or a steering signal to drive the vehicle 1 along the generated driving route, and may transmit a driving signal, a braking signal, and a steering signal to the drive system 12, the braking system 32, and the steering system 42, respectively.

The memory 142 may store programs and/or data needed for allowing the processor 141 to process image data, may store programs and/or data needed for the processor 141 to process radar data, and may store programs and/or data needed for the processor 141 to generate a brake signal and/or a steering signal.

The memory 142 may temporarily store image data received from the forward-view camera 110 and/or radar data received from the radars 120 and 130, and may also temporarily store the processed results of the image data and/or the radar data handled by the processor 141.

The memory 142 may include not only a volatile memory, such as a Static Random Access memory (SRAM) or a Dynamic Random Access Memory (DRAM), but also a non-volatile memory, such as a flash memory, a Read Only Memory (ROM), or an Erasable Programmable Read Only Memory (EPROM), The scope or spirit of the DAS 100 according to the present disclosure is not limited to FIG. 2, and the DAS 100 may additionally or alternatively include a Light Detection And Ranging (LiDAR) sensor to detect the presence or absence of a peripheral object by monitoring (or scanning) the peripheral region of the vehicle 1.

As such, the controller 140 may transmit a braking signal to the braking system 32 based on whether a collision with a front object is predicted. In addition, the controller 140 may transmit a steering signal to the steering system 42 to avoid a collision with a front object.

The controller 140 may control an object around the vehicle 1 and set a free-space in which the vehicle 1 can travel based on a relative position and/or a relative speed of the detected object. In addition, the controller 140 may generate a driving route through which the vehicle 1 can travel without colliding with an object in the free-space.

Figure 4:
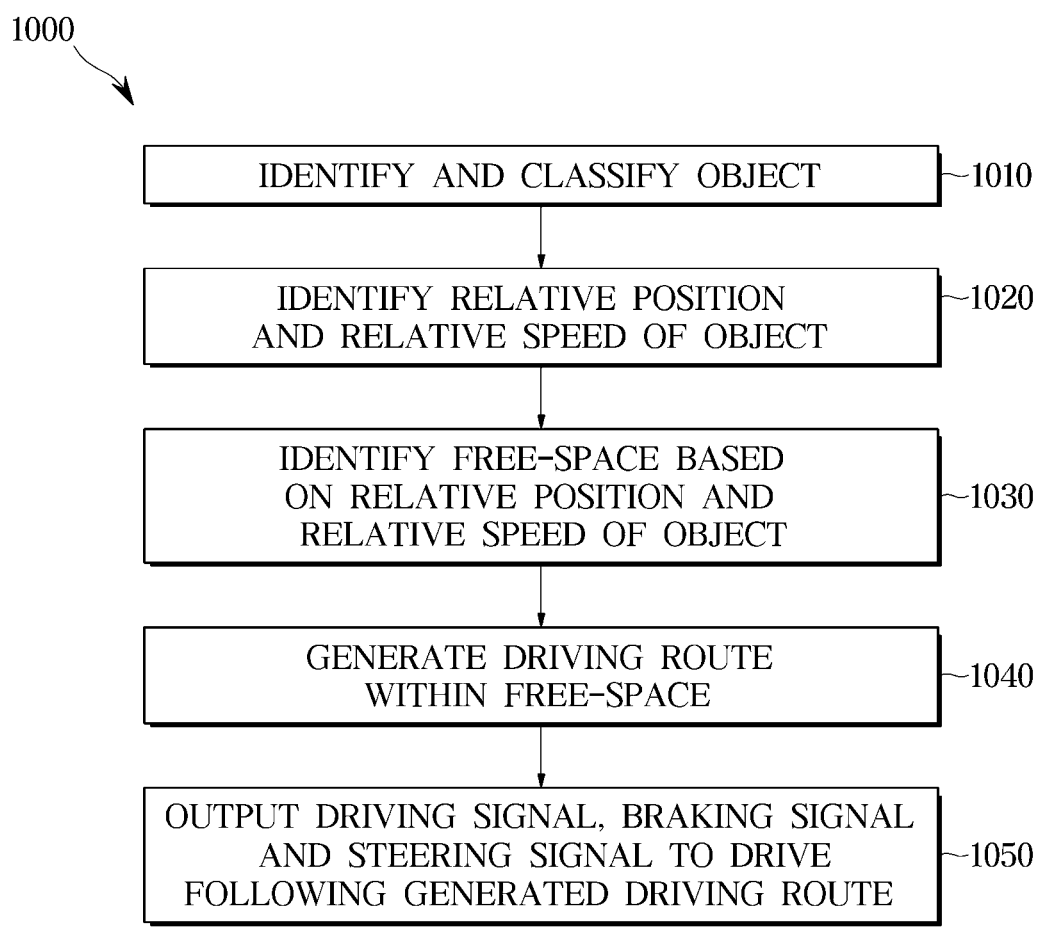
FIG. 4 illustrates a method of generating a route by a driver assistance apparatus according to an exemplary embodiment.
Figure 5:
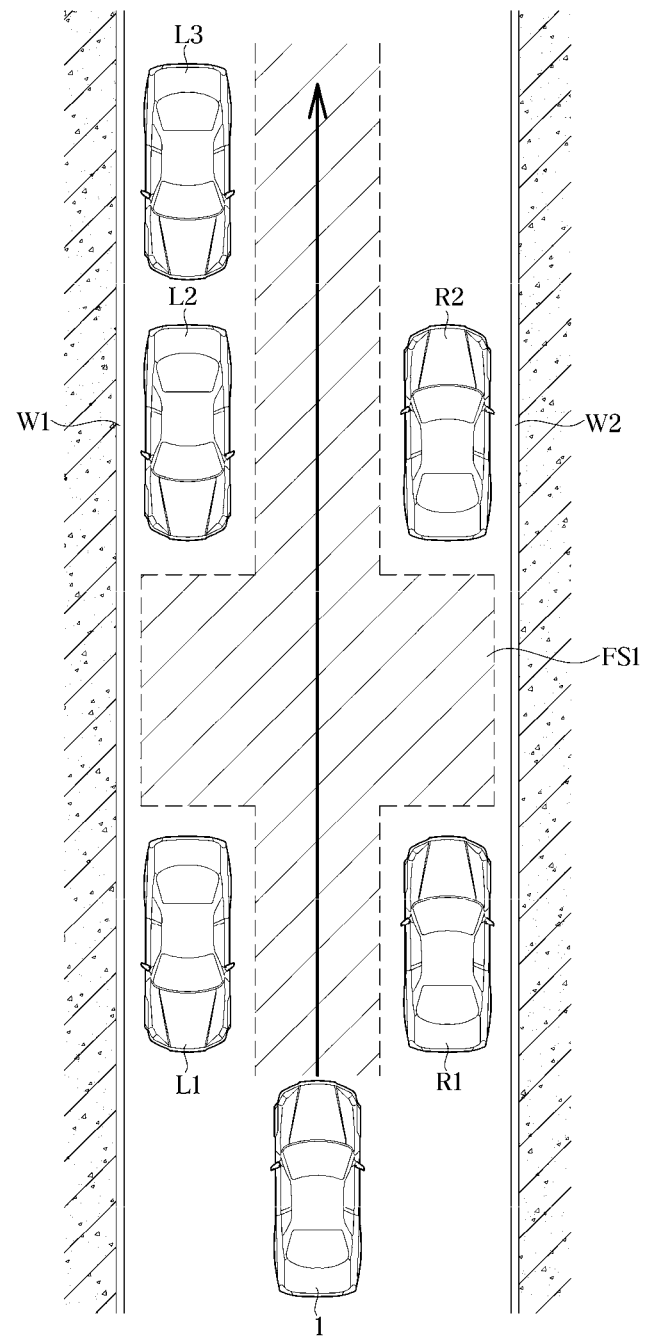
FIGS. 5 and 6 illustrate an example of generating a driving route of a vehicle according to the route generating method illustrated in FIG. 4.
Figure 6:
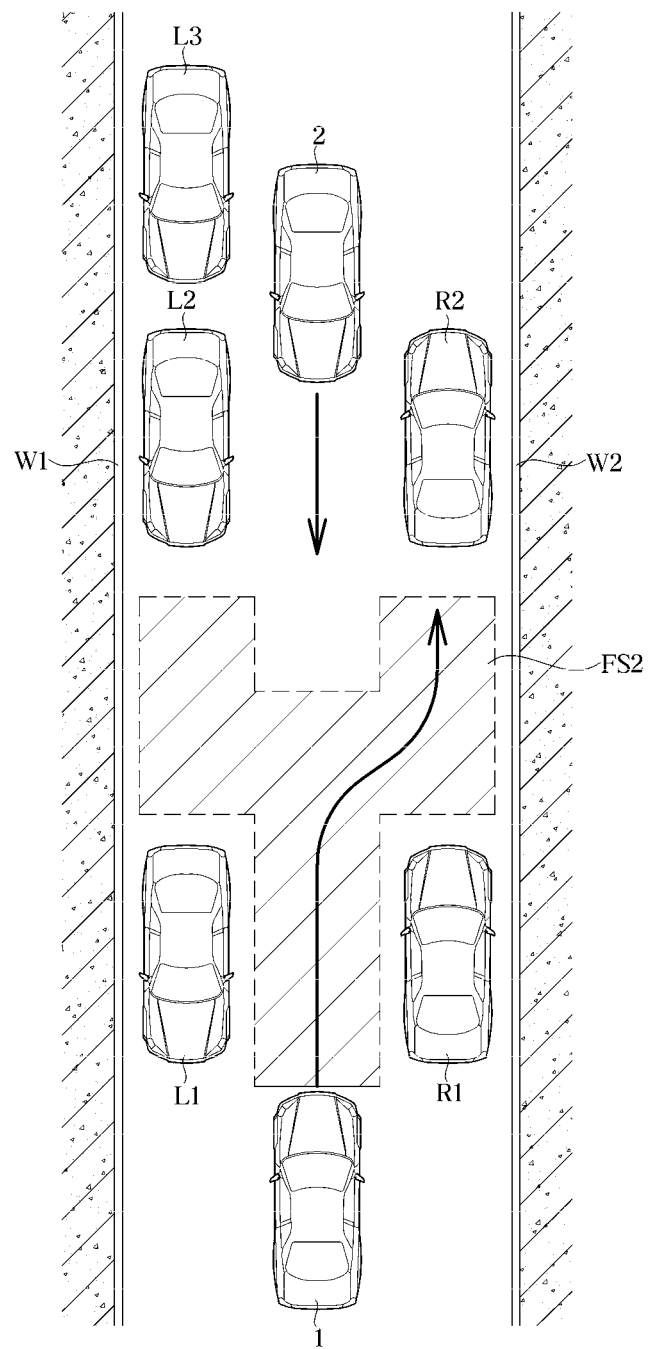

FIG. 4 illustrates a method of generating a route by a driver assistance apparatus according to an exemplary embodiment. FIGS. 5 and 6 illustrate an example of generating a driving route of a vehicle according to the route generating method illustrated in FIG. 4.

The driver assistance system 100 identifies and classifies objects around the vehicle 1 (1010).

While the vehicle 1 is traveling or stationary, the front camera 110 of the driver assistance system 100 may acquire image data in front of and/or around the vehicle 1. The controller 140 of the driver assistance system 100 may acquire image data from the forward-view camera 110. The controller 140 may identify and classify objects located in front of and/or around the vehicle 1 based on the image data. For example, the controller 140 may identify objects including signs, other vehicles, pedestrians, bicycles, road boundaries, animals, traffic lights, etc. located in front and/or around the vehicle 1. In addition, the controller 140 may classify the identified object into signs, other vehicles, pedestrians, bicycles, road boundaries, animals, and traffic lights.

While the vehicle 1 is traveling or stationary, the forward-view radar/corner radars 120 and 130 of the driver assistance system 100 may acquire sensing data in front of and/or around the vehicle 1. The controller 140 may acquire sensing data from the forward-view radar/corner radars 120 and 130. The controller 140 may identify objects located in front of and/or around the vehicle 1 based on the sensing data.

The controller 140 identifies objects located in front of and/or around the vehicle 1 by relying only on image data of the front camera 110, or identifies objects located in front of and/or around the vehicle 1 by relying only on detection data from forward-view radar/corner radar (120, 130).

The controller 140 may identify objects located in front of and/or around the vehicle 1 based on image data of the front camera 110 and detection data of the forward-view radar/corner radars 120 and 130. For example, controller 140 may identify common objects among the identified objects based on the objects identified based on the image data of the front camera 110 and the detection data of the forward-view radar/corner radars 120 and 130.

Furthermore, the controller 140 may identify objects located in front of and/or around the vehicle 1 based on the communication data of the wireless communication device 61 and the image data of the front camera 110 and the detection data of the forward-view radar/corner radars 120 and 130. For example, the controller 140 receives information on surrounding vehicles through the wireless communication device 61, and may identify a vehicle located in front of and/or around the vehicle 1 based on information on surrounding vehicles.

The driver assistance system 100 identifies the relative position and relative speed of objects around the vehicle 1 (1020).

The controller 140 identifies the relative positions of objects located in front of and/or around the vehicle 1 based on the image data, and identifies the relative speeds of objects located in front of and/or around the vehicle 1 based on a plurality of consecutive image data. For example, the controller 140 may identify the relative positions of the objects based on the position (coordinate) of the object and the size of the object (the number of pixels occupied by the object) in the image according to the image data. In addition, the controller 140 may identify the relative speeds of objects based on a change in a position of an object and a change in a size of the object in an image by a plurality of consecutive image data.

The controller 140 may identify the relative positions and relative speeds of objects located in front of and/or around the vehicle 1 based on the sensing data. For example, the controller 140 may identify relative positions of objects located in front of and/or around the vehicle 1 based on a time until a radio wave reflected from the object is received and an angle at which the radio wave is received. Further, the controller 140 may identify the relative speeds of objects located in front of and/or around the vehicle 1 based on a change in frequency (Doppler effect) of radio waves reflected from the object.

In addition, the controller 140 may identify a relative position and a relative speed of an object located in front of and/or around the vehicle 1 based on the image data of the forward-view camera 110 and the detection data of the forward-view radar/corner radars 120, 130. For example, the controller 140 may determine the relative position in the horizontal direction and the relative speed in the horizontal direction based on the image data of the forward-view camera 110. The controller 140 may determine a longitudinal relative position and a longitudinal relative speed of the object based on the detection data of the forward-view radar/corner radars 120 and 130. Here, the horizontal direction indicates a direction perpendicular to the driving direction of the vehicle 1, and the vertical direction may indicate a direction parallel to the driving direction of the vehicle 1.

The driver assistance system 100 determines the free space based on the relative position and relative speed of the object (1030).

The controller 140 may classify a stationary object and a moving object based on the relative speed of the object and the driving speed of the vehicle 1.

The controller 140 may set a space, that is, a free-space, in which an object does not currently exist or an object is not expected to exist within a reference time for moving the vehicle 1 based on the relative position of the stationary object and the relative position/relative velocity of the moving object.

For example, as shown in FIG. 5, the controller 140 may set a free-space in which an object does not exist based on the relative positions of (stopped) objects. The controller 140 identifies a left wall (W1), a left first vehicle (L1), a left second vehicle (L2), a left third vehicle (L3), a right wall (W2), a right first vehicle (R1), and a right second vehicle, and determines its relative position based on image data and/or sensing data. The controller 140 may identify the free-space FS1 based on the relative positions of the identified objects W1, W2, L1, L2, L3, R1, and R2.

As another example, as illustrated in FIG. 6, the controller 140 may set a free-space in which an object is expected to not exist within a reference time based on a relative position of objects and a relative speed of moving objects. The controller 140 identifies the relative position of the stationary objects (W1, W2, L1, L2, L3, R1, R2) and the relative position and relative speed of another moving vehicle 2 based on image data and/or detection data, and may identify free-space candidates based on the relative positions of the still objects W1, W2, L1, L2, L3, R1, and R2. Alternatively, the controller 140 may identify the free-space FS2 from the candidate of the free-space based on the relative position and the relative speed of the moving vehicle 2. For example, the controller 140 may identify the free-space FS2 reduced by a range in which the other vehicle 2 can move from the current relative position for the reference time in the candidate of the free-space.

The driver assistance system 100 creates a driving route for driving the vehicle 1 in the free-space (1040).

The controller 140 may create a driving route in order for the vehicle 1 to travel without colliding with an object in the free-space. In addition, the controller 140 may create a driving route for reaching a location closest to a destination within the free space within the shortest time.

For example, as illustrated in FIG. 5, when there is no other moving vehicle (opposite vehicle), the controller 140 may generate a driving route along a central portion of the free-space.

As another example, when there is another vehicle 2 moving as shown in FIG. 6, the controller 140 may generate a driving route passing through the free-space between the vehicles R1 and R2 on the right in order to avoid a collision with another vehicle 2.

The controller 140 can create a driving route through the free-space between the vehicles R1 and R2 on the right under the right traffic system, and can generate a driving route through the free-space between the left vehicles L1 and L2 under the left traffic system.

The driver assistance system 100 outputs a driving signal and/or a braking signal and/or a steering signal so that the vehicle 1 travels along the driving route (1050).

The controller 140 generates a driving signal and/or a braking signal and/or a steering signal so that the vehicle 1 travels along the driving route, and may transmit a driving signal, a braking signal, and a steering signal to the drive system 12, the braking system 32, and the steering system 42, respectively.

As described above, the driver assistance system 100 sets a free-space based on the relative position and/or the relative speed of objects around the vehicle 1, and may create a driving route for driving the vehicle 1 without collision in the free-space.

Thereby, the driver assistance system 100 can assist the driving of the vehicle 1 so that the vehicle 1 can travel without collision with an object on a preceding vehicle and a road without lanes (e.g., alleyways).

Figure 7:
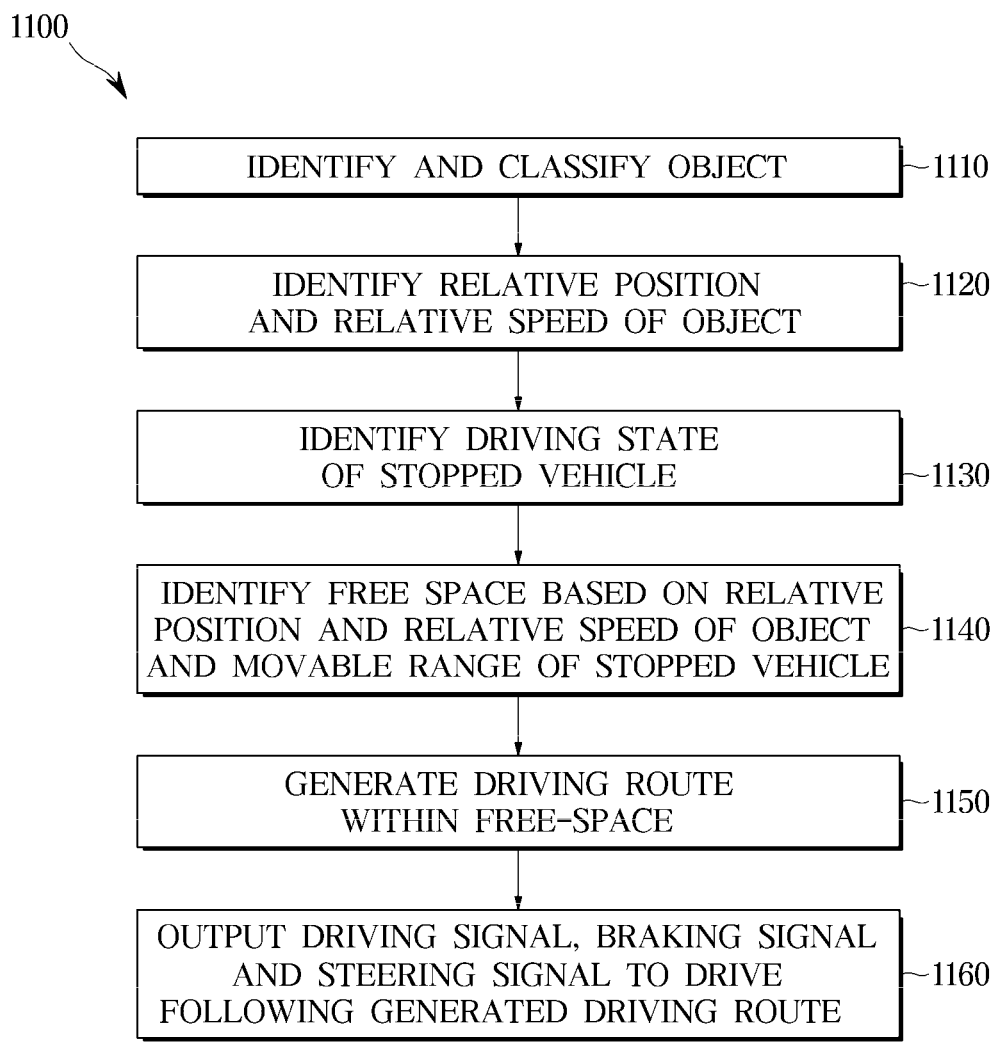
FIG. 7 is a diagram illustrating a method of generating a route by a driver assistance apparatus according to an exemplary embodiment.
Figure 8:
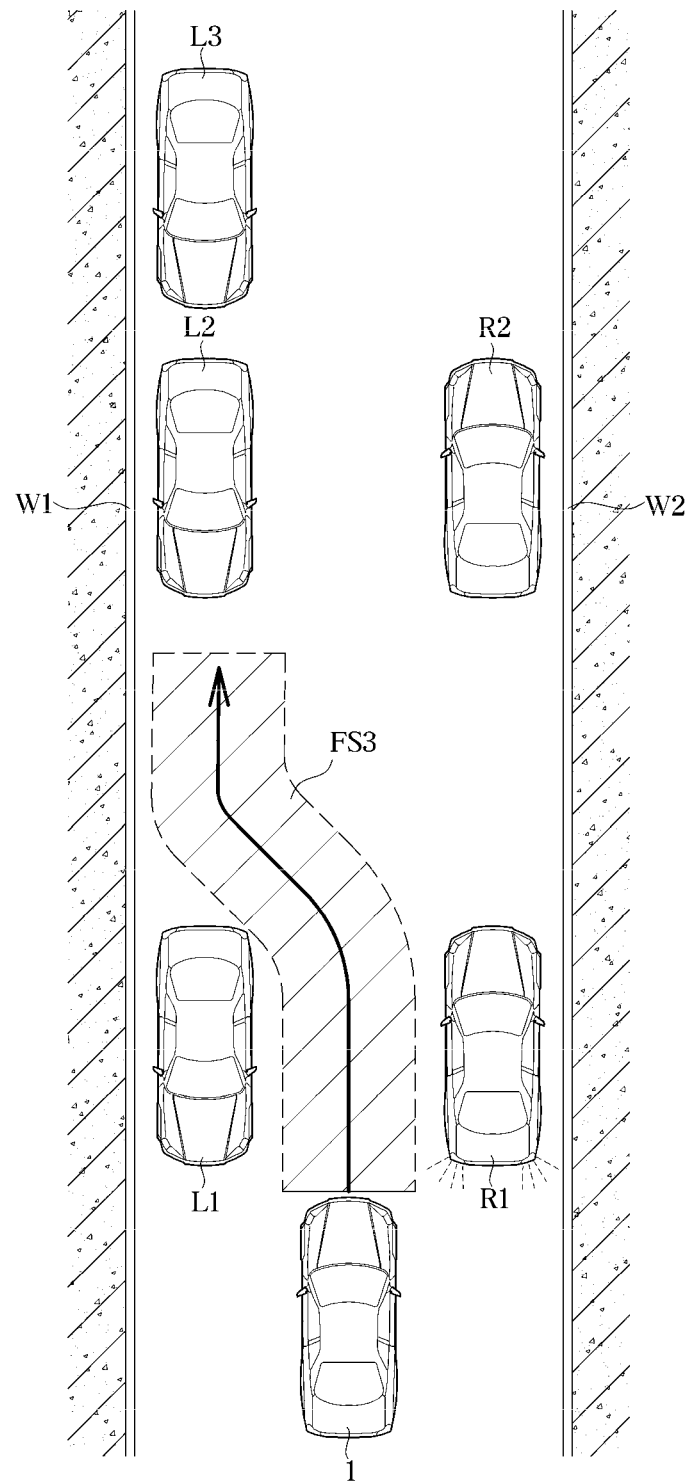
FIGS. 8, 9, and 10 illustrate an example of generating a driving route of a vehicle according to the route generation method illustrated in FIG. 7.
Figure 9:
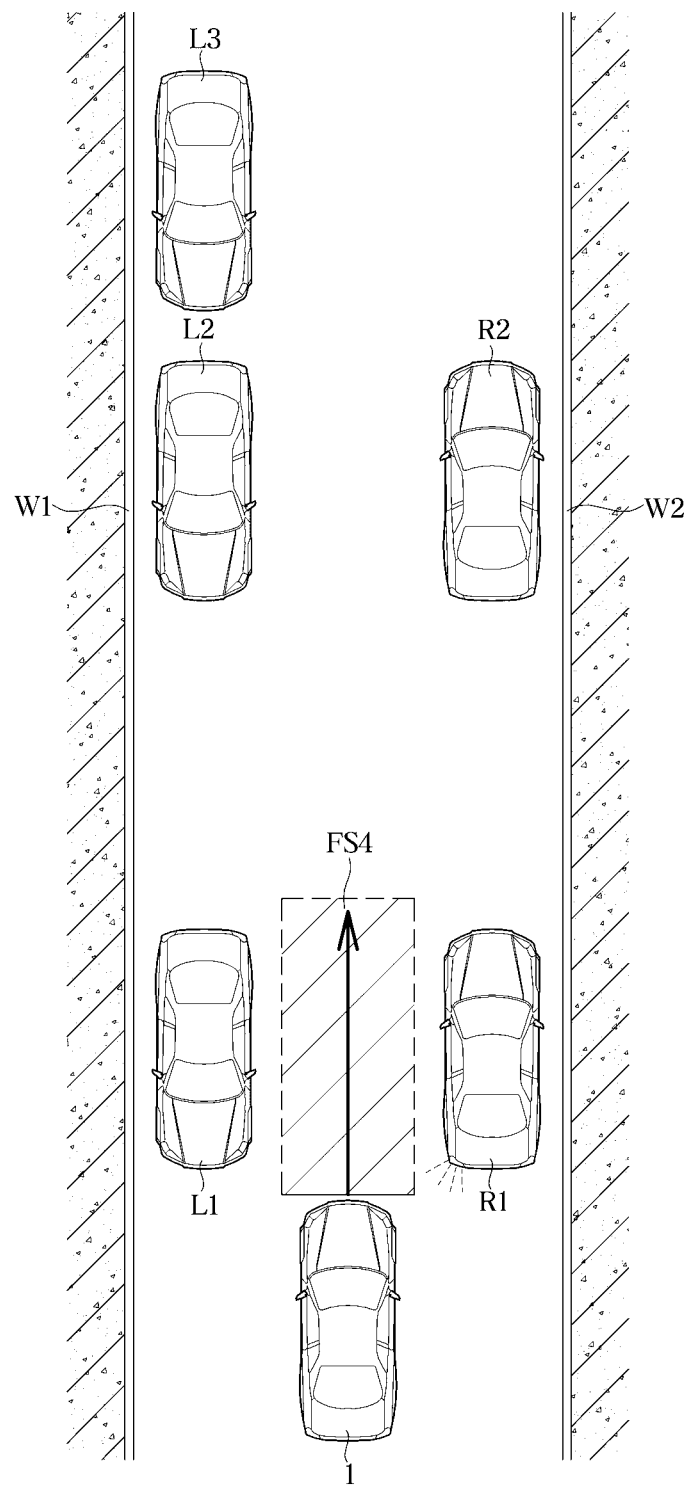
Figure 10:
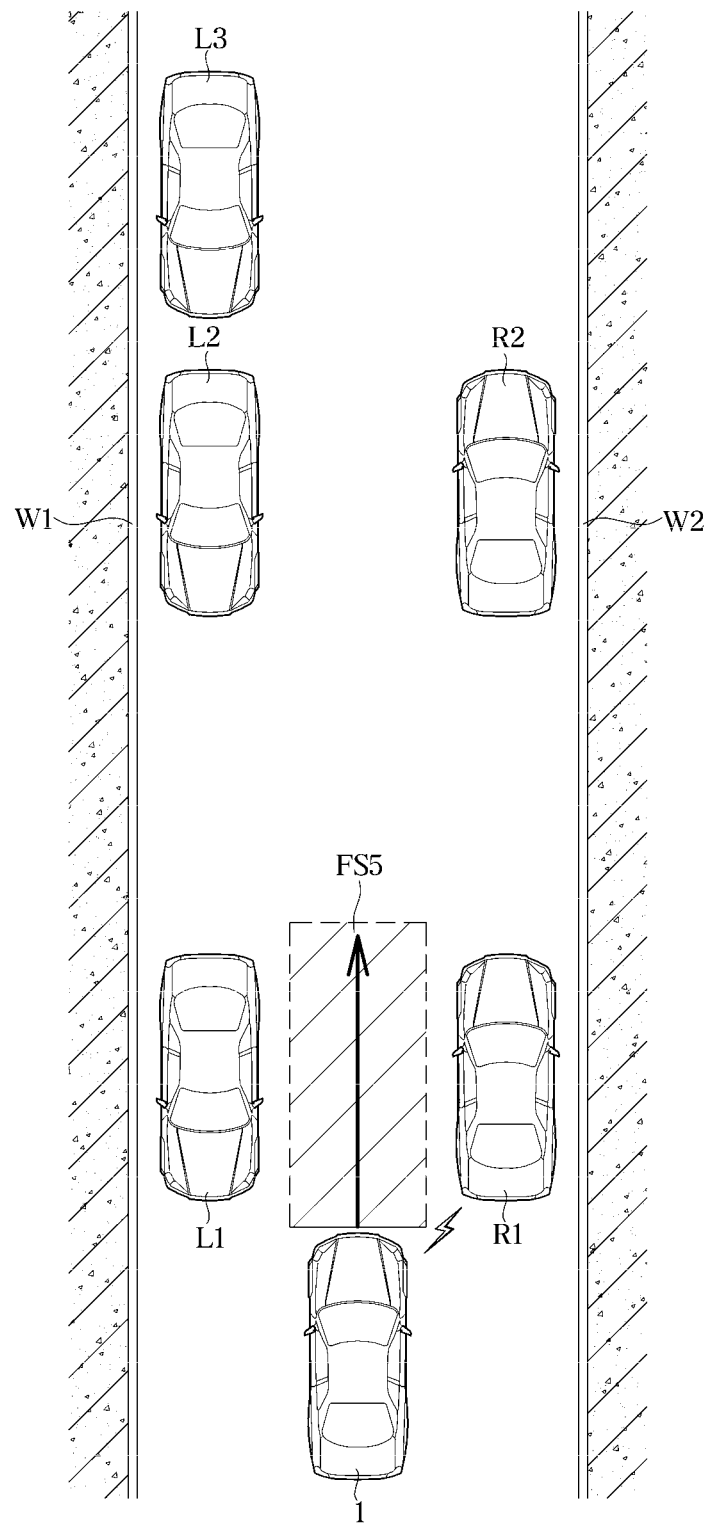

FIG. 7 is a diagram illustrating a method of generating a route by a driver assistance apparatus according to an exemplary embodiment. FIGS. 8, 9, and 10 illustrate an example of generating a driving route of a vehicle according to the route generation method illustrated in FIG. 7.

As shown in FIGS. 7, 8, 9, and 10, a method 1100 of generating a route of the driver assistance apparatus will be described.

The driver assistance system 100 identifies and classifies objects around the vehicle 1 (1110). The driver assistance system 100 identifies the relative position and relative speed of objects around the vehicle 1 (1120).

Operations 1110 and 1120 may be the same as operations 1010 and 1020 illustrated in FIG. 4.

The driver assistance system 100 identifies the driving state of another stopped vehicle (1130).

As described in operation 1110 and operation 1120, the controller 140 may identify the classification of the object and the relative speed of the object. Also, the controller 140 may identify another vehicle that is stopped based on the classification of the object and the relative speed of the object.

The controller 140 may identify a driving state of another stopped vehicle based on the image data of the forward-view camera 110. Specifically, the controller 140 may identify whether another stored vehicle is stopped or parked.

The controller 140 may identify a light source (e.g., a headlight or fog light or a tail light or a direction indicator light of a vehicle) from the image data of the forward-view camera 110.

For example, the forward-view camera 110 may include a red filter and output red image data that has passed the red filter, and the controller 140 may identify whether the tail light of another vehicle is on based on the red image data. In addition, the forward-view camera 110 can output color image data, and the controller 140 can identify whether the tail light of another vehicle is on by applying a red color filter to the color image data.

When it is identified that the tail light of another vehicle is on, the controller 140 can determine that the vehicle with the tail light on is stopped. As shown in FIG. 8, when it is identified that the tail light of the right first vehicle R1 is lit, the controller 140 may determine that the right first vehicle R1 is stopped.

As another example, the forward-view camera 110 may acquire a plurality of consecutive image data, and the controller 140 may extract image data of a plurality of consecutive other vehicles from the plurality of consecutive image data. Further, the controller 140 may identify a direction indicator light whose brightness changes (blinks) at a predetermined period based on image data of a plurality of consecutive vehicles.

When it is identified that the direction indicator light of another vehicle is blinking, the controller 140 may determine that the vehicle whose direction indicator light is blinking is stopped. As illustrated in FIG. 9, when it is identified that the direction indicator light of the right first vehicle R1 is blinking, the controller 140 may determine that the right first vehicle R1 is stopped.

In addition, the controller 140 may identify a driving state of another stopped vehicle based on communication data received through the wireless communication device 61.

The driver assistance system 100 may receive information on driving of another vehicle (hereinafter referred to as "driving information") through the wireless communication device 61 installed in the vehicle 1. For example, the controller 140 may receive location information of another vehicle (e.g., an absolute position using a GPS signal), a driving speed, a steering angle, and the like through the wireless communication device 61.

The controller 140 may determine whether another vehicle is stopped based on driving information of another vehicle received through the wireless communication device 61. As shown in FIG. 10, the controller 140 may receive driving information of the right first vehicle R1, and may determine that the stationary right first vehicle R1 is stopped based on the driving information of the first right vehicle R1, the controller 140.

The driver assistance system 100 determines the free space based on the relative position of the object and the relative speed, and the possible movement range of another vehicle at a stop (1140).

The controller 140 may set a space, that is, a free-space, in which an object does not currently exist or an object is not expected to exist within a reference time for moving the vehicle 1 based on the relative position of the stationary object and the relative position/relative speed of the moving object and the movable range of other stopped vehicles.

For example, as illustrated in FIG. 8, the controller 140 may identify a candidate of a free-space in which the object does not exist, based on the relative positions of (stopped) objects. The controller 140 may identify the relative positions of the still objects W1, W2, L1, L2, L3, R1, R2 based on the image data and/or the sensing data. The controller 140 may identify a candidate for free-space based on the relative positions of the still objects W1, W2, L1, L2, L3, R1, and R2. The controller 140 may determine an available range of movement of the right first vehicle R1 determined to be stopping based on the lit tail light. For example, the controller 140 may determine a movable range in which the right first vehicle R1 can travel for a predetermined time based on the direction in which the right first vehicle R1 is facing and the position of the right second vehicle R2 obstructing the driving route of the right first vehicle R1.

The controller 140 may set the free-space from the candidate of the free-space based on the movable range in which the right first vehicle R1 can travel. For example, the controller 140 may identify the free-space FS3 reduced by a movable range in which the right first vehicle R1 can travel from the candidate for the free-space.

As another example, as illustrated in FIG. 9, the controller 140 may identify the movable range of the right first vehicle R1 determined to be stopped based on the blinking direction indicator light. Also, the controller 140 may set a free-space in which the vehicle 1 can travel, based on a movable range in which the right first vehicle R1 can travel. In particular, since the blinking direction indicator light indicates the willingness of the driver of the right first vehicle R1 to drive, the controller 140 may set a free-space so as not to overtake the right first vehicle R1.

As another example, as shown in FIG. 10, the controller 140 identifies the movable range of the right first vehicle R1 determined to be stopped based on the driving information received through the wireless communication device 61, and may set a free-space in which the vehicle 1 can travel based on the movable range in which the right first vehicle R1 can travel.

The driver assistance system 100 generates a driving route for driving the vehicle 1 in the free-space (1150). The driver assistance system 100 outputs a driving signal and/or a braking signal and/or a steering signal so that the vehicle 1 travels along a driving route (1160).

Operations 1150 and 1160 may be the same as operations 1040 and 1050 shown in FIG. 4.

As described above, the driver assistance system 100 sets a free-space based on the relative position of other vehicles stopped around the vehicle, and may generate a driving route for driving the vehicle 1 without collision in the free-space.

Thereby, the driver assistance system 100 can assist the driving of the vehicle 1 so that even if the stopped vehicle moves abruptly, the vehicle 1 can travel without collision with the stopped vehicle.

DESCRIPTION OF SYMBOLS

| | |
|---|---|
| 1: vehicle | 100: driver assistance system |
| 110: forward-view camera | 120: forward-view radar |
| 130: corner radars | 131: first corner radar |
| 132: second corner radar | 133: third corner radar |
| 134: fourth corner radar | 140: controller |

What is claimed is:

1. A driver assistance system (DAS), comprising:
a camera disposed on a host vehicle, having a field of view in front of the host vehicle, and configured to acquire image data;
a controller including a processor configured to process the image data,
wherein the controller is configured to:
identify at least one object obstructing a driving of the host vehicle based on the image data,
identify a stopped vehicle among the at least one object based on the image data,
set a free-space candidate based on a position of the at least one object,
set a free-space as a space reduced from the free-space candidate by a movable range in which the stopped vehicle can travel from a current relative position thereof for a reference time,
set a driving route for the host vehicle to travel within the free-space, and
control at least one of a braking device or a steering device of the host vehicle so that the host vehicle travels along the driving route.

2. The driver assistance system according to claim 1, wherein the controller is further configured to:
set a first free-space candidate based on a position of a stopped object among the at least one object,
identify a movable range in which a moving object among the at least one object can travel based on a position and a relative speed of the moving object, and
set the free-space candidate based on a difference between the first free-space candidate and the movable range in which the moving object can travel.

3. The driver assistance system according to claim 1, wherein the controller is further configured to determine, based on the image data, that a driving state of the stopped vehicle is a stopped state and not a parked state, upon determining that the stopped vehicle includes a lit tail light.

4. The driver assistance system according to claim 1, wherein the controller is further configured to determine, based on the image data, that a driving state of the stopped vehicle is a stopped state and not a parked state, upon determining that the stopped vehicle includes a flashing direction indicator light.

5. The driver assistance system according to claim 1, wherein the controller is further configured to:
receive driving information of the stopped vehicle through a wireless communication device installed in the host vehicle, and
determine, based on the driving information of the stopped vehicle, that a driving state of the stopped vehicle is a stopped state and not a parked state.

6. The driver assistance system according to claim 1, wherein the controller identifies a moving vehicle among the at least one object based on the image data, and identifies the free-space as a space reduced from the free-space candidate a movable range in which the moving vehicle can travel from a current position of the moving vehicle for a reference time.

7. The driver assistance system according to claim 1, wherein the controller is further configured to set the free-space so as not to overtake the stopped vehicle, upon determining that the stopped vehicle includes a flashing direction indicator light.

8. A driver assistance method, the method comprising:
processing image data acquired by a camera installed in a host vehicle and having a field of view in front of the host vehicle;
identifying at least one object obstructing the driving of the host vehicle based on the image data;
identifying a stopped vehicle among the at least one object based on the image data;
setting a free-space candidate based on a position of the at least one object;
setting a free-space as a space reduced from the free-space candidate by a movable range in which the stopped vehicle can travel from a current relative position thereof for a reference time;
setting a driving route for the host vehicle to travel within the free-space; and
controlling at least one of a braking device or a steering device of the host vehicle so that the host vehicle travels along the driving route.

9. The method according to claim 8, wherein the setting of the free-space candidate includes:
setting a first free-space candidate based on a position of a stopped object among the at least one object,
identifying a movable range in which a moving object among the at least one object can travel based on a position and a relative speed of the moving object, and
setting the free-space candidate based on a difference between the first free-space candidate and the movable range in which the moving object can travel.

10. The method according to claim 8, wherein the identifying of the stopped vehicle includes determining, based on the image data, that a driving state of the stopped vehicle is a stopped state and not a parked state, upon determining that the stopped vehicle includes a lit tail light.

11. The method according to claim 8, wherein the identifying of the stopped vehicle includes determining, based on the image data, that a driving state of the stopped vehicle is a stopped state and not a parked state, upon determining that the stopped vehicle includes a flashing direction indicator light.

12. The method according to claim 8, wherein the identifying of the stopped vehicle includes determining, based on driving information of the stopped vehicle received through a wireless communication device installed in the host vehicle, that a driving state of the stopped vehicle is a stopped state and not a parked state.

13. The method according to claim 8 further comprising:
acquiring detection data by a sensor having at least one detection field of a front and a side of the host vehicle by a group consisting of a radar sensor and a lidar sensor installed in the host vehicle;
identifying the position of at least one object based on the image data and the detection data.

14. The method according to claim 8, wherein the setting of the free-space includes identifying a moving vehicle among the at least one object based on the image data, and identifying the free-space as a space reduced from the free-space candidate by a movable range in which the moving vehicle can travel from a current position of the moving vehicle for a reference time.

15. The method according to claim 8, wherein the setting of the free-space includes setting the free-space so as not to overtake the stopped vehicle, upon determining that the stopped vehicle includes a flashing direction indicator light.

16. A driver assistance system (DAS), comprising:
a camera installed on a host vehicle, having a field of view in front of the host vehicle, and configured to acquire image data;
a sensor configured to have at least one detection field of the front and side of the host vehicle, and obtain detection data in the group consisting of a radar sensor and a lidar sensor which are installed in the host vehicle;
a controller including a processor configured to process the image data and the detection data,
wherein the controller is configured to:
identify at least one object obstructing a driving of the host vehicle based on the image data and the detection data,
identify a position and speed of at least one object based on the image data and the detection data,
identify a stopped vehicle among the at least one object based on the image data,
set a free-space candidate based on the position and speed of the at least one object,
set a free-space as a space reduced from the free-space candidate by a movable range in which the stopped vehicle can travel from a current relative position thereof for a reference time,
set a driving route for the host vehicle to travel within the free-space, and
control at least one of a braking device or a steering device of the host vehicle so that the host vehicle travels along the driving route.

17. The driver assistance system according to claim 16, wherein the controller is further configured to determine, based on the image data that a driving state of the stopped vehicle is a stopped state and not a parked state, upon determining that the stopped vehicle includes a lit tail light.

18. The driver assistance system according to claim 16, wherein the controller is further configured to determine, based on the image data that a driving state of the stopped vehicle is a stopped state and not a parked state, upon determining that the stopped vehicle includes a flashing direction indicator light.

19. The driver assistance system according to claim 16, wherein the controller is further configured to:
receive driving information of the stopped vehicle through a wireless communication device installed in the host vehicle, and
determine, based on the driving information of the stopped vehicle, that a driving state of the stopped vehicle is a stopped state and not a parked state.

20. The driver assistance system according to claim 16, wherein the controller identifies a moving vehicle among the at least one object based on the image data, and identifies the free-space as a space reduced from the free-space candidate by a movable range in which the moving vehicle can travel from a current position of the moving vehicle for a reference time.

* * * * *